US010149564B1

(12) United States Patent
Elam

(10) Patent No.: US 10,149,564 B1
(45) Date of Patent: Dec. 11, 2018

(54) COMBINED BUTTER STICK PLATFORM AND CORN REST

(71) Applicant: Chad Elam, Oxford, OH (US)

(72) Inventor: Chad Elam, Oxford, OH (US)

(73) Assignee: MIDWEST CACTUS, LLC, Oxford, OH (US)

( * ) Notice: Subject to any disclaimer, the term of this patent is extended or adjusted under 35 U.S.C. 154(b) by 0 days.

(21) Appl. No.: 15/674,632

(22) Filed: Aug. 11, 2017

(51) Int. Cl.
*B05C 3/09* (2006.01)
*A47G 19/00* (2006.01)
*B05C 13/02* (2006.01)
*A47J 9/00* (2006.01)

(52) U.S. Cl.
CPC ............ *A47G 19/303* (2013.01); *B05C 13/02* (2013.01); *A47J 9/00* (2013.01)

(58) Field of Classification Search
CPC ......... A47G 19/303; A47G 19/30; A47J 9/00; A47J 9/001; B05C 13/00; B05C 13/02; B05C 13/025
USPC .............................................. 118/13; D7/502
See application file for complete search history.

(56) References Cited

U.S. PATENT DOCUMENTS

| 1,097,465 | A | 5/1914 | Pratt |
| 1,253,917 | A | 1/1918 | Wern |
| 1,410,307 | A | 3/1922 | Holcomb et al. |
| 1,494,018 | A | 5/1924 | Randolph |
| 2,458,120 | A | 1/1949 | Volpini |
| 2,478,122 | A | 8/1949 | Mossel |
| D157,183 | S | 2/1950 | Newell |
| 2,527,149 | A | 10/1950 | Peterson |
| 2,581,745 | A | 1/1952 | Amorino |
| 2,606,364 | A | 8/1952 | Gustafson |
| 2,691,877 | A | 10/1954 | Frolich |
| 2,750,767 | A | 6/1956 | Von Knauf |
| 2,808,020 | A | 10/1957 | Arvidson |
| 2,811,844 | A | 11/1957 | Selmer |
| 2,893,032 | A | 7/1959 | Selmer |
| 2,903,997 | A | 9/1959 | Hay |
| 2,948,260 | A | 8/1960 | Lubore |

(Continued)

FOREIGN PATENT DOCUMENTS

CA 627872 A 9/1961

OTHER PUBLICATIONS

USPTO Non-Final Office Action dated Jun. 15, 2017 for related Design U.S. Appl. No. 29/552,317, filed Jan. 21, 2016 (11 pages).

*Primary Examiner* — Laura Edwards
(74) *Attorney, Agent, or Firm* — Daniel F. Nesbitt; Hasse & Nesbitt LLC

(57) ABSTRACT

A device for buttering an ear of corn having a butter stick platform and a corn rest. The butter stick platform has an upper butter base surface for supporting a butter stick, and a peripheral wall extending downward to a base. A containment wall can surround and be separated laterally from the peripheral wall to provide a trough between the peripheral wall and the containment wall. The corn rest has a corn base having a concave upper surface with openings for placement thereupon of an ear of corn, and a frame having side walls that extend downwardly partly into the trough when the corn rest is in a first position resting upon a stick of butter. As the butter stick melts and is used, the frame rides downward into the trough to maintain contact between the ear of corn and the butter stick.

19 Claims, 7 Drawing Sheets

(56) References Cited

U.S. PATENT DOCUMENTS

| | | | |
|---|---|---|---|
| 3,308,269 | A | 3/1967 | Stocker |
| 3,396,697 | A | 8/1968 | Bieser |
| D217,007 | S | 3/1970 | Smith |
| 3,652,171 | A | 3/1972 | Carlson |
| 3,669,063 | A | 6/1972 | Daniluke |
| 3,735,487 | A | 5/1973 | Wojcik |
| 3,736,152 | A | 5/1973 | Turner |
| 4,301,762 | A | 11/1981 | Burnett, Jr. |
| 4,408,919 | A | 10/1983 | Wolff et al. |
| D272,796 | S | 2/1984 | Wolff |
| D295,597 | S | 5/1988 | Devito |
| D297,200 | S | 8/1988 | Devito |
| 5,421,663 | A | 6/1995 | Bravo |
| D375,661 | S | 11/1996 | Ross et al. |
| D397,918 | S | 9/1998 | Martinovic |
| 5,858,089 | A | 1/1999 | Martinovic |
| D407,275 | S | 3/1999 | Foster |
| 6,299,368 | B1 | 10/2001 | Tavularis |
| 6,932,530 | B1 | 8/2005 | Bissel |
| 7,396,176 | B2 | 7/2008 | Schoemer |
| 7,658,566 | B2 | 2/2010 | Wangler |
| 8,146,468 | B1 | 4/2012 | Kachelries |
| 8,215,856 | B1 | 7/2012 | Daubach et al. |
| 8,573,873 | B2 | 11/2013 | Kalush |
| D720,098 | S | 12/2014 | Septien Prieto |
| 9,113,734 | B1 * | 8/2015 | Cianca ................... A23G 3/24 |
| 2011/0194883 | A1 | 8/2011 | Kalush |

* cited by examiner

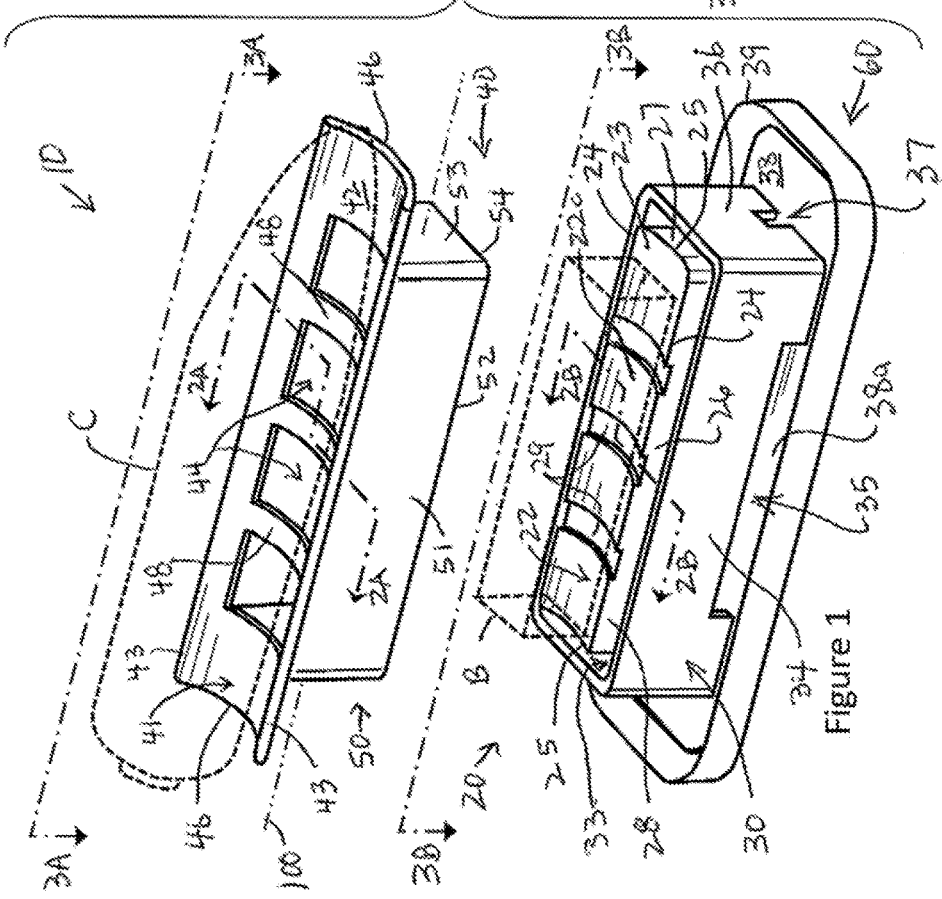
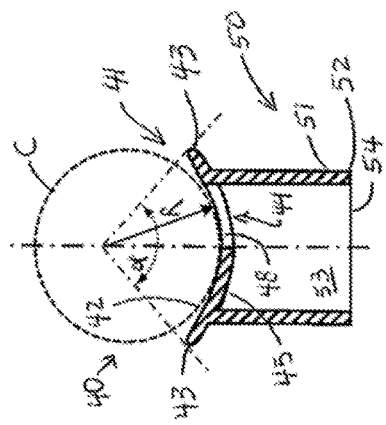
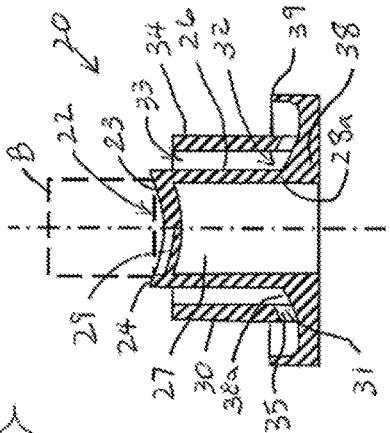
Figure 1
Figure 2A
Figure 2B

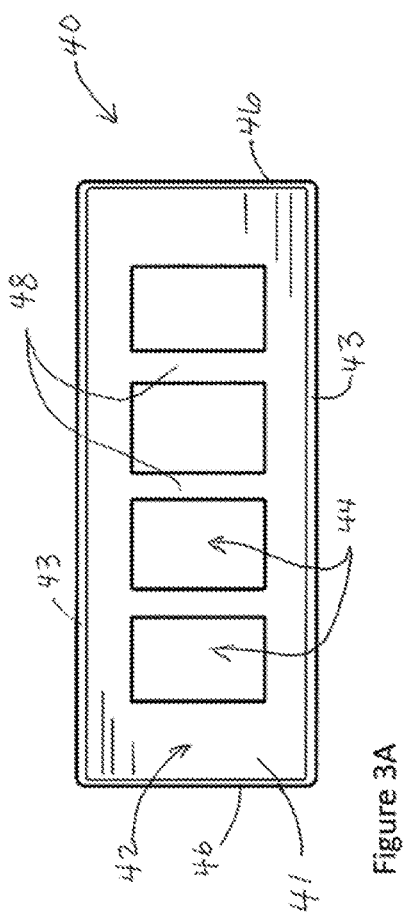
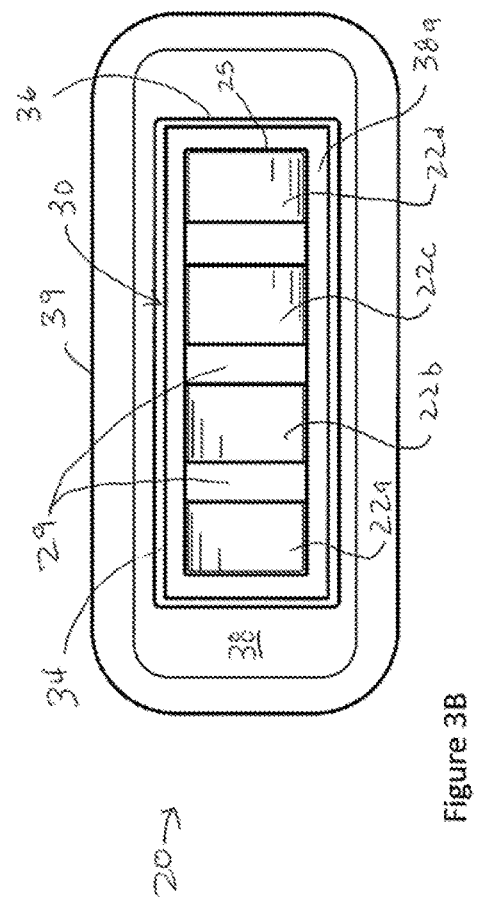
Figure 3A
Figure 3B

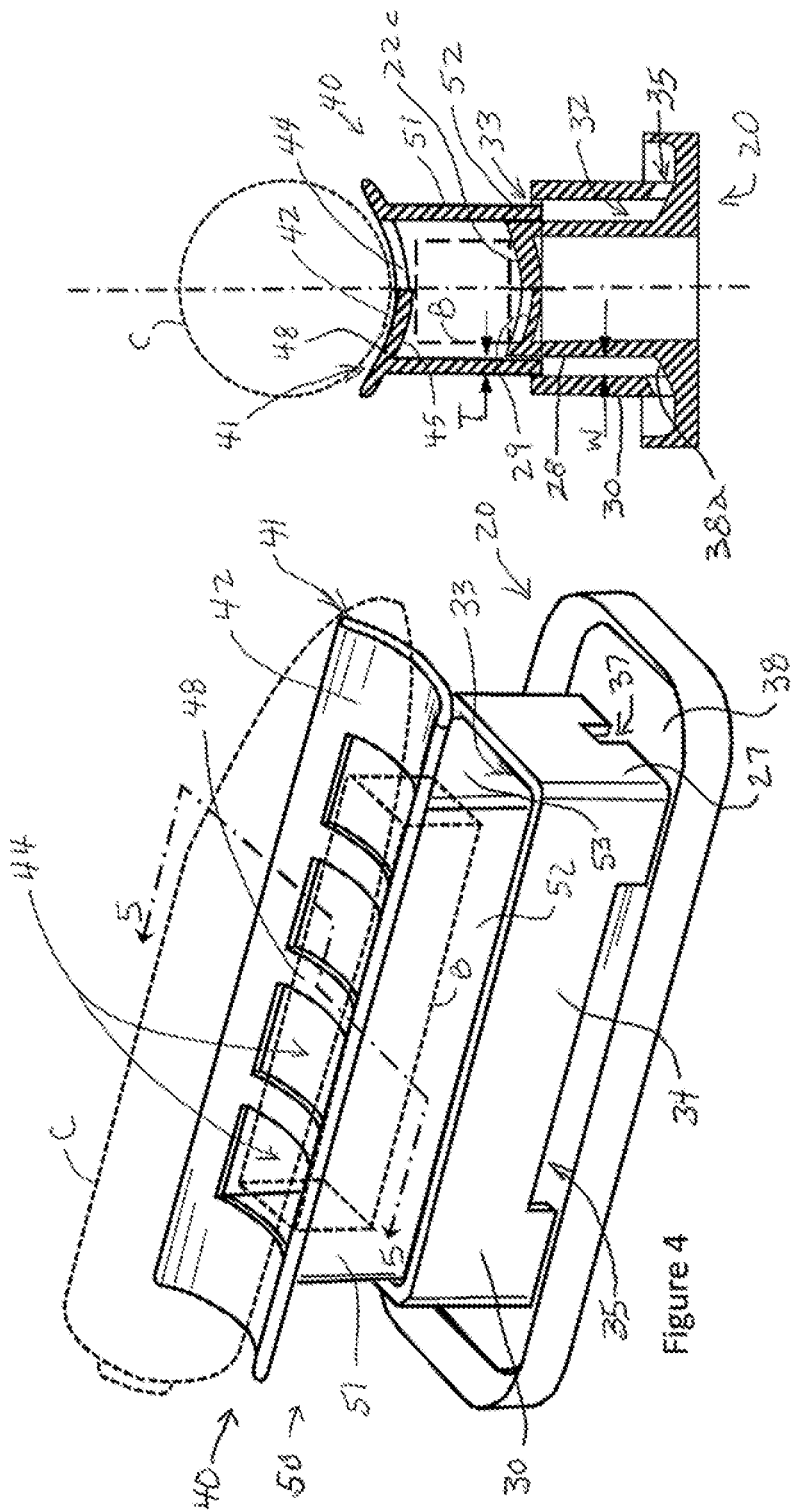

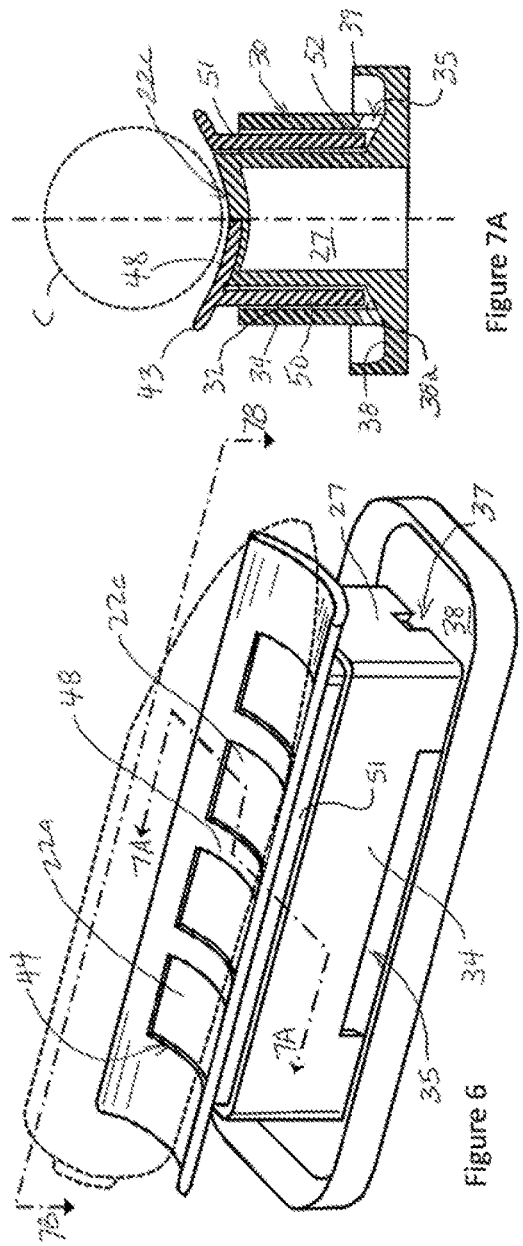
Figure 6
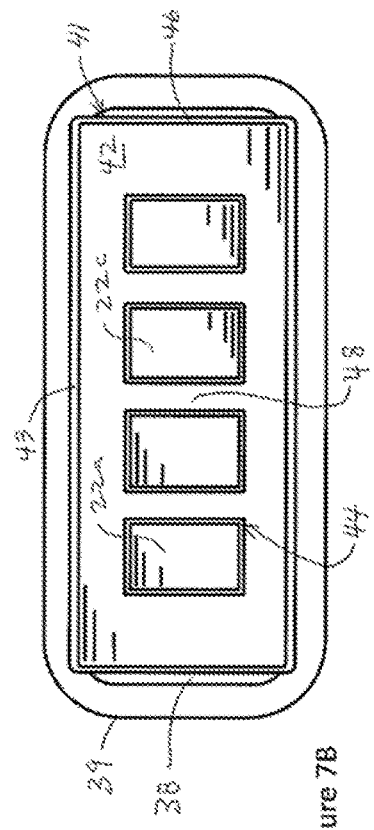
Figure 7A
Figure 7B

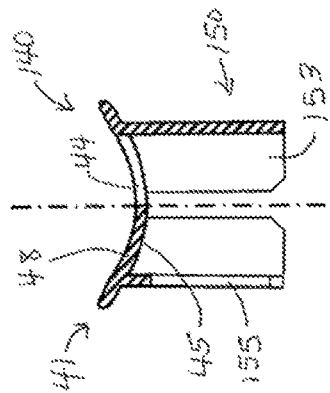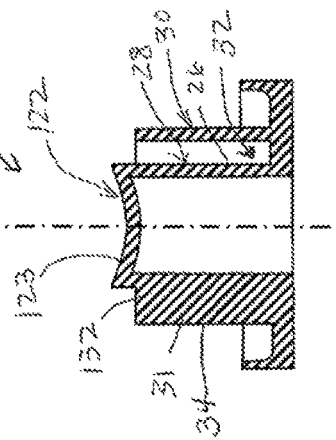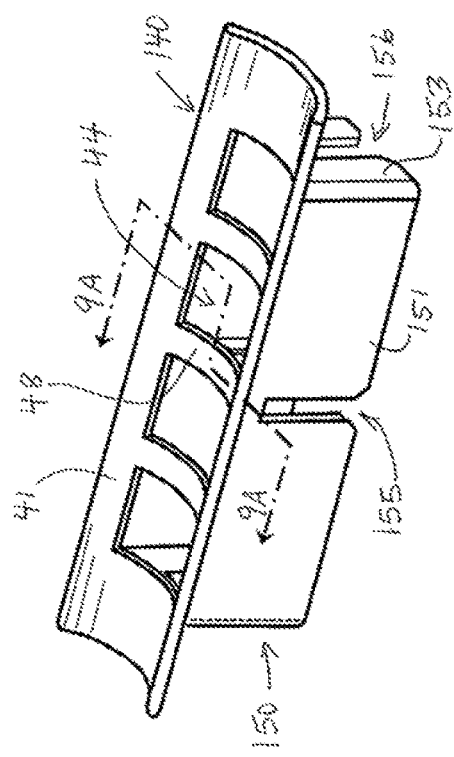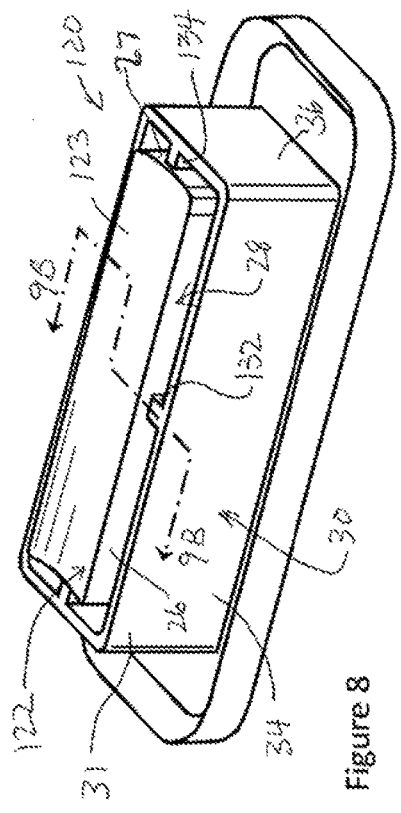

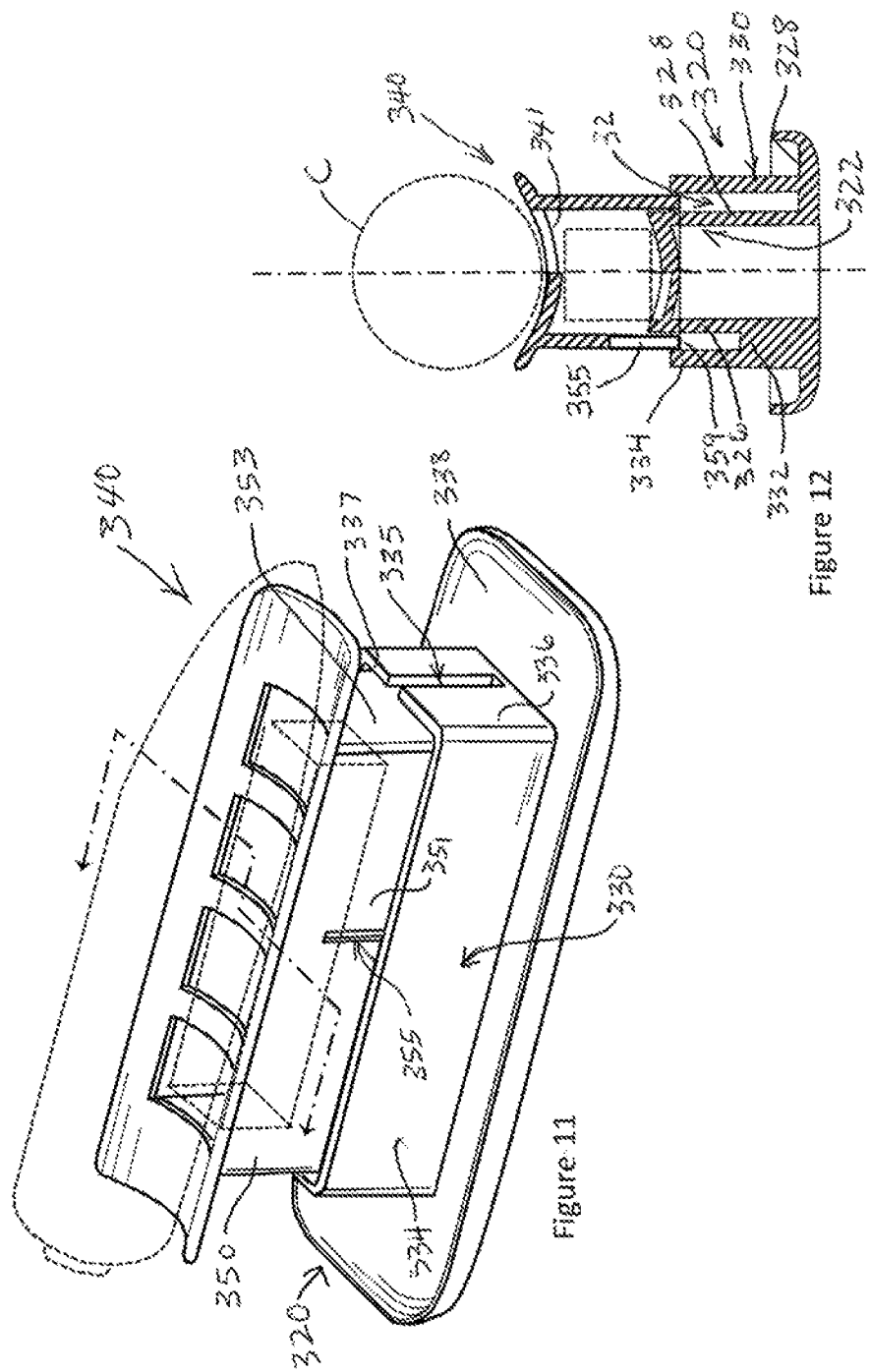

COMBINED BUTTER STICK PLATFORM AND CORN REST

BACKGROUND OF THE INVENTION

Buttered ears of corn have been a popular food in the US and worldwide for decades. There have been a large number of devices made to apply a coating of butter onto the warm kernels of an ear of corn, all hoping to provide a convenient and efficient to butter one's corn.

SUMMARY OF THE INVENTION

The present invention provides a device that is simple to use by persons of any age, and effective to apply a coating of melted butter on the kernels of an ear of corn, without the mess of melted butter all over surfaces and implements.

The present invention provides a device for buttering an ear of corn, comprising: a) a butter stick rest including a butter base including an upper surface configured for placement thereupon a stick of butter, and a peripheral wall including a pair of opposed side walls and a pair of opposed end walls extending downward from the lateral side edges and end edges, respectively, of the butter base, to a lower edge; b) a corn rest comprising i) a corn base including a concave upper surface configured for placement thereupon an ear of corn, and the concave upper surface having lateral side edges and an undersurface, and having one or more openings, and ii) a frame comprising a pair of opposed side walls that extend downwardly from an underside of the corn base and having a distal edge, wherein the distal edges of the opposed side walls extend partially along an upper portion of the peripheral wall when the corn rest is in a first position, and extend substantially completely down along the peripheral wall when the corn rest is in a second position; and c) a base including a floor, wherein the lower edge of the peripheral wall attaches to, and extends upward from, the floor.

In an embodiment of the invention, the butter stick rest further includes a containment wall including a pair of opposed side walls and a pair of opposed end walls, the containment wall surrounding and disposed laterally outwardly from the peripheral wall of the butter base to provide a trough between an outside surface of the peripheral wall, and an inside surface of the containment wall, wherein the distal edges of said opposed side walls of the frame extend partially into the trough of the butter stick rest when the corn rest is in the first position, and extend substantially completely down into the trough of the butter stick rest when the corn rest is in the second position, and a lower edge of the containment wall attaches to, and extends upward from, the floor.

In an embodiment of the invention, a stick of butter placed upon the butter base of the butter stick platform supports the corn rest in the first position with the undersurface of the corn base resting on a top surface of the butter stick.

In an embodiment of the invention, the undersurface of the corn base has a curvature similar to the curvature of the concave upper surface of the corn base, and the butter base has a concave upper surface having a curvature similar to the curvature of the undersurface of the corn base.

In an embodiment of the invention, the corn base has two or more openings there through, aligned along a length of the corn base, wherein one or more lateral strips of the corn base separate the adjacent two or more openings.

In an embodiment of the invention, the corn base has four or more openings.

In an embodiment of the invention, the butter base has one or more lateral grooves formed into the upper surface, across the width of the butter base, which segregate the butter base into several separate platforms, wherein the one or more grooves are spaced apart and configured to register with and to accept the one or more lateral strips of the corn base.

In an embodiment of the invention, the containment wall has one or more drainage slot disposed along the lower edge adjacent the floor, to drain a liquid disposed within the trough out through the one or more drainage slot.

In an embodiment of the invention, the floor includes a tapered portion disposed between the peripheral wall and the containment wall that tapers downward away from the lower end of the peripheral wall, toward the one or more drainage slot.

In an embodiment of the invention, the butter stick platform further includes at least one brace that extends from the inside surface of the containment wall to the outside surface of the peripheral wall, to rigidly secure the containment wall to the peripheral wall, and wherein the opposed side wall of the frame of the corn rest has at least one vertical slot that registers with the at least one brace.

The device is useful to butter an ear of corn with a stick of butter or margarine, or other flavored butters. The device of the present invention is also useful as a device with ears of corn or with other foods having an elongated, cylindrical shape, and that can be buttered or coated with a flavoring.

BRIEF DESCRIPTION OF THE FIGURES

FIG. 1 is a perspective view of a combined butter stick platform and corn rest, in a separated state.

FIG. 2A is a sectional view of the corn rest of FIG. 1, taken through line 2A-2A.

FIG. 2B is a sectional view of the butter stick platform of FIG. 1, taken through line 2B-2B.

FIG. 3A is a plan view of the corn rest of FIG. 1, taken through line 3A-3A.

FIG. 3B is a plan view of the butter stick platform of FIG. 1, taken through line 3B-3B.

FIG. 4 is the combined butter stick platform and corn rest of FIG. 1, with a butter stick resting on the butter stick platform, the undersurface of the corn base resting on a top surface of the butter stick, and an ear of corn resting on the corn base.

FIG. 5 is a sectional view of the combined butter stick platform and corn rest of FIG. 4, taken through line 5-5.

FIG. 6 is a perspective view of the combined butter stick platform and corn rest of FIG. 1, in a nested position where the side walls of the corn rest extend fully into a trough of the butter stick platform.

FIG. 7A is a sectional view of the combined butter stick platform and corn rest of FIG. 6, taken through line 7A-7A.

FIG. 7B is a plan view of the combined butter stick platform and corn rest of FIG. 6, taken through line 7B-7B.

FIG. 8 is an alternative embodiment of a combined butter stick platform and corn rest, in a separated state.

FIG. 9A is a sectional view of the corn rest of FIG. 8, taken through line 9A-9A.

FIG. 91B is a sectional view of the butter stick platform of FIG. 8, taken through line 9B-9B.

FIG. 11 is another embodiment of a combined butter stick platform and corn rest, butter stick resting on the butter stick platform, the undersurface of the corn base resting on a top surface of the butter stick, and an ear of corn resting on the corn base.

FIG. 12 is a sectional view of the combined butter stick platform and corn rest of FIG. 11, taken through line 12-12.

DETAILED DESCRIPTION OF THE INVENTION

Figure 10:
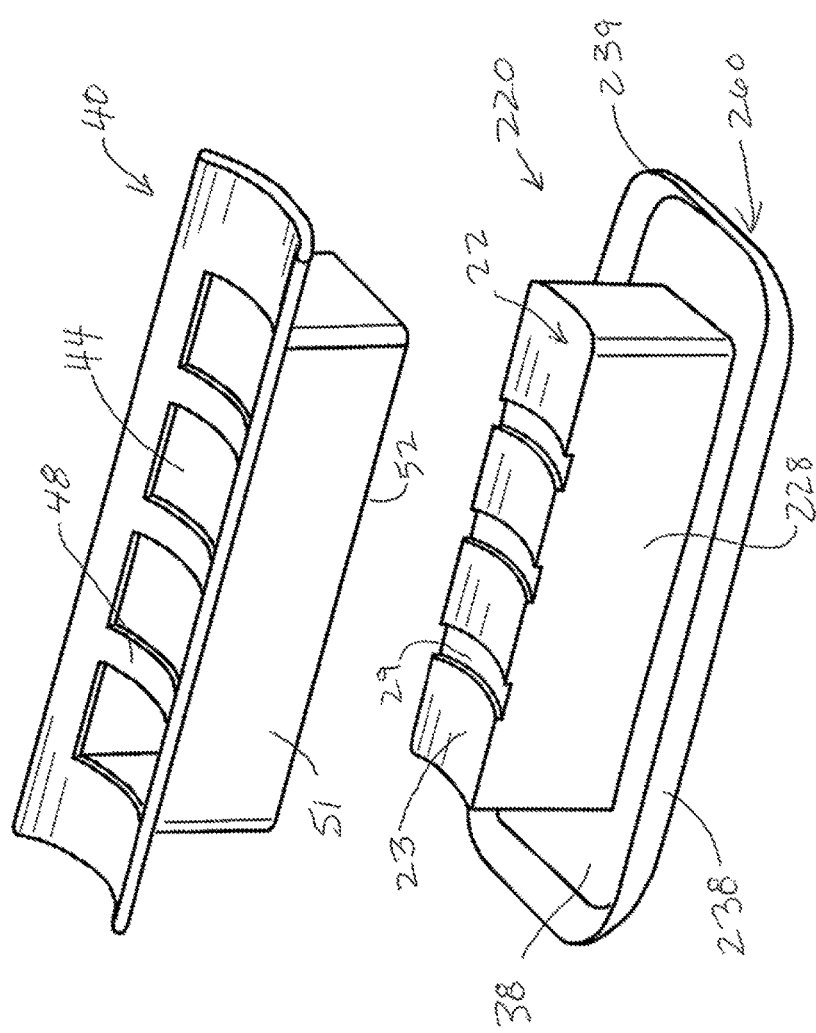
FIG. 10 is another alternative embodiment of a combined butter stick platform and corn rest, in a separated state.

FIGS. 1, 2A and 2B, and 3A and 3B show a device for buttering an ear of corn with a stick of butter. The device 10 includes a butter stick platform 20 and a corn rest 40 which are separate pieces. The butter stick platform 20 is associated with, and moves vertically relative to, the corn rest 40, and these cooperate to provide an improved means for buttering an ear of corn.

The butter stick platform 20 has a butter base 22 including an upper surface 23 configured for placement thereupon a stick of butter B. The upper surface 23 of the butter base 22 can be concave, and can have a curvature sufficient to support and retain an ear of corn upon the upper surface 23. The upper surface 23 has lateral side edges 24 and end edges 25, which define a periphery of the upper surface 23. An ear of corn can extend beyond the end edges 25. A peripheral wall 28 includes a pair of opposed side walls 26 extending downward from the lateral side edges 24 of the upper surface 23, and includes a pair of opposed end walls 27 extending downward from the end edges 25 of the upper surface 23. Typically, the peripheral wall 28 extends downward from the entire periphery of the butter base 22. A lower end 28a of the peripheral wall 28 is affixed to an upper surface of a floor 38 of a base 60 that includes a raised edge 39. The floor 38 includes a proximal tapered portion 38a disposed between the peripheral wall 28 and a containment wall 30, described below, and tapers downward away from the lower end 28a of the peripheral wall 28, to drain a liquid away from the peripheral wall 28.

The butter stick platform 20 also includes a containment wall 30 which surrounds the peripheral wall 28, and is separated laterally from (stands off from) the peripheral wall 28 to provide a narrow trough 32 having an upper opening 33 there into. The containment wall 30 includes a pair of opposed side walls 34, and a pair of opposed end walls 36. The narrow trough 32 is defined between an outside surface of the peripheral wall 28 and an inside surface of the containment wall 30, and extends around the entire periphery of the butter base 22, A lower end 31 of the containment wall 30 is affixed rigidly to the upper surface of the floor 38. The trough 32 is therefore enclosed by the peripheral wall 28, the containment wall 30 and the floor 38, with a top opening 33 along the periphery.

The containment wall 30 also includes one or more openings disposed along the periphery of the lower end 31. The lower end 31 of both lateral side walls 34 has an elongated drainage slot 35, and the lower end 31 of both end walls 36 has a drainage slot 37. The drainage slots 35 and 37 provide a port along the floor 38 to allow liquid that is deposited within the trough 32 to drain out through the lower end 31 of the containment wall 30. This can prevent an accumulation of melted butter in the trough between the periphery wall of the butter base 22 and the containment wall 30. The tapered portion 38a of the floor 38 assists in moving liquid away from the periphery wall of the butter base 22, and out through the drainage slots 35,37.

The butter base 22 can include one or more grooves 29 formed into the upper surface 23, which run laterally across the width of the butter base 22, and are formed into the upper surface 23 with a uniform depth. The grooves 29 segregates the butter base 22 into several distinct platforms 22a, 22b, 22c and 22d. The one or more grooves 29 are spaced apart and configured to register with and to accept one or more lateral strips 48 of a corn base 41, described below.

The corn rest 40 includes the corn base 41, which includes lateral sides 43, end sides 46, and a concave upper surface 42. The concave upper surface 42 has a curvature for stable placement thereupon of an ear of corn C. In one embodiment, the curvature of the upper surface 42 comprises a radius R. The arc angle α defined by the opposed lateral edges 43 of the upper surface 42 is at least 45°, and up to about 180°, and is more typically at least 60° and up to about 90°. The corn base 41 also has an undersurface 45, and a number of openings 44 through the corn base 41, extending from the upper surface 42 to the undersurface 45. The openings 44 provide communication between a stick of butter B, disposed on the butter base 22 and beneath the corn rest 40, and the ear of corn C resting upon the corn base 41. The openings 44 are typically square in plan view, but can be any shape, and are distributed along the length of the corn base 41 to register with the upper surface of the butter base 22, so that the openings 44 expose a large and sufficient amount of the upper surface of the stick of butter B. The openings 44 are separated by lateral strips 48 that provide rigidity and support for the corn base 41. The lateral strips 48 are spaced apart and configured to register with and to be accepted within the grooves 29 of the butter base 22, while the openings 44 are configured to register with and to accept the distinct platforms 22a, 22b, etc. The lateral strips 48 also have a thickness, between the upper surface 42 and the undersurface 45 that is substantially the same as the depth of the grooves 29 of the butter base 22. The undersurface 45 of the corn base 41 has a convex curvature, preferably matching the curvature of the concave upper surface 42, and similar to or matching the concave curvature of the upper surface 23 of the butter base 22 and the grooves 29. This, along with registering of the lateral strips 48 within the grooves 29, allows the curvature of the corn base 41 to nest against the concave curvature of the butter base 22 and grooves 29, and to minimize any voids or openings in which melted butter can pool within, away from the upper surface of the corn base 41, and to reduce waste.

The corn rest 40 also includes a frame 50 having a pair of opposed side walls 51 that extend downwardly from the undersurface 45, disposed laterally from a centerline 100 of the corn base 41 toward the lateral sides 43 of the corn base 41, and register laterally with the trough 32 between the side wall 34 and side wall 26 of the butter stick platform 20. The side walls 51 extend to a distal lower edge 52. The frame 50 also has a pair of opposed end walls 53 that extend, downwardly from the undersurface 45 of the corn base 41, disposed toward the end edges 46 of the corn base 41, and registered laterally with the trough 32. The end walls 53 extend to a distal lower edge 54. The opposed side walls 51 and opposed end walls 53 can be attached at adjacent ends to form the peripheral frame 50.

A first position of the corn rest 40 and the butter stick platform 20 is shown in FIG. 4 and its sectional view FIG. 5, where the distal, edges 52 of the opposed side walls 51 extend partially beyond the upper opening 33 and into the trough 32 of the butter stick platform 20, and is representative of a stick of butter B placed upon the butter base 22, with the corn rest 40 placed over the butter stick B with the undersurface 45 of the corn base 41 resting on a top surface of the butter stick B.

The thickness (T) of the side walls 51 and end walls 53 is less than the width (W) of the trough 32, between the peripheral wall 28 and the containment wall 30 of the butter stick platform 20. This allows the walls 51 of the peripheral frame 50 to slide down through the top opening 33 and into the trough 32 when the corn rest 40 is in its second position, relative to the butter stick platforms 20, as shown in sectional view FIG. 5.

It can be understood that, as a warm ear of corn C rests upon the upper surface 42 of the corn base 41, the heat and weight of the ear of corn melts a portion of the upper surface of the butter stick B, which pools into the openings 44 and covers the kernels of the ear of corn. As more butter melts from the upper surface of the butter stick, the corn rest 40, with the ear of corn C thereupon, rides downward, and the lower edges 52 of the peripheral frame 50 descend further down into the trough 32. Eventually, when essentially all of the butter stick 13 has melted into liquid, the undersurface 45 of the corn base 41 will rest upon the butter base 22 in a second position as shown in FIG. 6 and its sectional view FIG. 7A, with the peripheral frame 50 positioned substantially entirely within the trough 32.

It can be understood that that melted butter that drains down into the trough 32 will drain down to the tapered portion 38a of the floor 38, out through the drainage slots 35 and 37 in the containment wall 30, and onto the upper surface of the floor 38, where it can be recovered or discarded.

FIG. 8 shows an alternative embodiment of a combined butter stick platform 120 and corn rest 140, in a separated state. This embodiment is similar to the embodiment shown in FIG. 1 with some differences. In this alternative embodiment, the butter stick platform 120 includes one or more braces placed between and affixed to either or both of the peripheral wall 28 and the containment wall 30 of the butter stick platform. In the illustrated embodiment, a brace 132 is positioned between the side wall 34 of the containment wall 30, and the side wall 26 of the butter stick platform 120. Optionally, a second brace 134 can be positioned between each opposed end wall 36 of the containment wall 30 and end wall 27 of the butter stick platform 120. The braces 132 and 134 improve the rigidity and integrity of both the peripheral wall 28 and the containment wall 30 of the butter stick platform 120.

To accommodate the braces 132 and 134 when the corn rest 140 is positioned onto and moves into its second position upon the butter stick platform 120, the side walls 151 and end walls 153 of the frame 150 have vertical slots 155 and 156, respectively, that are configured to register with and accept the braces 132 and 134, and that extend upward toward the corn base 41 sufficiently to allow the peripheral wall 150 of the frame 150 to slide down fully into the trough 32 of the butter stick platform 120, so that corn base 41 rests upon the butter base 122. The vertical slots 155 and 156 are slightly wider than the width of the braces 132,134 to allow free- or low-friction movement vertically of the frame 150 of the corn rest 140 down and over the butter stick platform 120. The lower end of the vertical slots 155,156 can be tapered to aid in placement and alignment of the corn rest 140 over the butter stick platform 120.

FIG. 8 also shows a butter base 122 including an upper surface 123 without any lateral grooves as shown in the first embodiment, although this second embodiment can also include the lateral grooves 29 as shown in FIG. 1. In this second embodiment, the underside 45 of the lateral strips 48 of the corn base 41 rest directly onto the upper surface 123 of the butter base 122.

It can also be understood that the containment wall of the second embodiment can optionally have one or more drainage slot along the floor 38 to allow a liquid that is deposited within the trough 32 to drain out of the trough, as described in the first embodiment.

FIG. 10 shows another alternative embodiment of a combined butter stick platform 220 and corn rest 40, in a separated state. This embodiment is similar to the embodiment shown in FIG. 1, though in this alternative embodiment, the butter stick platform 220 does not include a containment wall or provide a trough. The corn rest 40 is similar to that shown in FIG. 1, and has a plurality of openings 44 separated by lateral strips 48, and the butter stick platform 220 has a butter base 22 having lateral grooves 29. The distal edges 52 of the opposed side walls 5l extend partially along the upper end of the peripheral wall 228 when the corn rest 40 is in the first position, and extend substantially completely down along the peripheral wall 228 when the corn rest 40 is in the second position.

Also, the illustrated embodiment has an alternate base 260 that has upwardly-sloped sides 238 extending from a planar floor 38, to provide a peripheral rim or lip 239 for easier grasping and handling of the device.

It can also be understood that the butter base 22 can have an upper surface 23 that does not have the plurality of grooves 29, as is shown by the butter stick platform 120 in FIG. 8.

FIGS. 11 and 12 show another alternative embodiment of a combined butter stick platform 320 and corn rest 340, with a butter stick B resting on the butter stick platform 320, the undersurface of the corn base 341 resting on a top surface of the butter stick B, and an ear of corn C resting on the corn rest 340.

In the illustrated embodiment, the butter stick platform 320 is similar to that shown in FIG. 1 with some differences. The butter stick platform 320 includes a butter base 322 that comprises peripheral wall 328 including a pair opposed side walls 326 and a pair of opposed end walls (not shown). The butter stick platform 320 also includes a containment wall 330 that includes a pair of opposed side wall 334, and a pair of opposed end walls 336. The respective opposed sidewalls 326,334 and end walls define a trough 32 therebetween. A brace 332, similar to the brace 132 illustrated in FIG. 8, is disposed between and affixed to either or both of the side wall 326 of the butter base 322 and the side wall 334 of the containment wall 330, and extends from the floor 338 partially, about half way, up the side wall 326. Optionally, a second said brace can be positioned between the opposite side wall 326 and side wall 334.

The corn rest 340 includes a frame 350 having a pair of opposed side walls 351 and a pair of opposed end walls 353. Each side wall 351 has a bottom edge 359 and a vertical slot 355 extending upward from the bottom edge. The vertical slot 355 is configured to register with and accept the brace 332 to extend upward toward the corn base 341 sufficiently to allow the frame 350 to slide down fully into the trough 32 of the butter stick platform 320.

The butter stick platform 320 also includes a vertical drain slot 335 formed into each end wall 336, extending up the end wall 336 from or near from the floor 338. In the illustrated embodiment, the vertical slot 335 extends from near the floor 338 to the upper edge 337 of the end wall 336. The vertical slot 335 is configured as a drain along the floor 338 in the end wall 336 to allow liquid, such as melted butter, deposited within the trough 32 to drain out the trough 32 and onto the floor 338.

The devices of the present invention can be made of a plastic material, or alternatively a metal, such as aluminum, by manufacturing methods well known in the art, which can include injection or thermoform molding, cast molding and additive manufacturing, including 3D printing.

I claim:

1. A device for buttering an ear of corn, comprising:
   a) a butter stick rest including a butter base including an upper surface configured for placement thereupon a stick of butter, and a peripheral wall including a pair of opposed side walls and a pair of opposed end walls extending downward from the lateral side edges and end edges, respectively, of the butter base, to a lower edge;
   b) a corn rest comprising
      i) a corn base including a concave upper surface configured for placement thereupon an ear of corn, and the concave upper surface having lateral side edges and an undersurface, and having one or more openings, and
      ii) a frame comprising a pair of opposed side walls that extend downwardly from an underside of the corn base and having distal edges,
      wherein the distal edges of the opposed side walls of the corn rest extend partially along an upper portion of the peripheral wall of the butter stick rest when the corn rest is in a first position at which the undersurface of the corn base rests on a top surface of a butter stick placed upon the butter base of the butter stick rest, and extend substantially completely down along the peripheral wall when the corn rest is in a second position at which the undersurface of the corn base rests upon the butter base; and
   c. a base including a floor, wherein the lower edge of the peripheral wall of the butter stick rest attaches to, and extends upward from, the floor.

2. The device according to claim 1, wherein the butter stick rest further includes a containment wall including a pair of opposed side walls and a pair of opposed end walls, the containment wall surrounding and disposed laterally outwardly from the peripheral wall of the butter base to provide a trough between an outside surface of the peripheral wall, and an inside surface of the containment wall, wherein the distal edges of said opposed side walls of the frame extend partially into the trough of the butter stick rest when the corn rest is in the first position, and extend substantially completely down into the trough of the butter stick rest when the corn rest is in the second position, and a lower edge of the containment wall attaches to, and extends upward from, the floor.

3. The device according to claim 2, wherein the undersurface of the corn base has a curvature similar to the curvature of the concave upper surface of the corn base, and the butter base has a concave upper surface having a curvature similar to the curvature of the undersurface of the corn base.

4. The device according to claim 3, wherein the corn base has two or more base openings formed through the concave upper surface and aligned along a length of the corn base, and the corn base includes one or more lateral strips that separate the two or more base openings.

5. The device according to claim 4, wherein the butter base has one or more lateral grooves formed into the upper surface, across the width of the butter base, which segregate the butter base into two or more separate platforms, wherein the one or more lateral grooves are spaced apart and configured to register with and to accept the one or more lateral strips of the corn base.

6. The device according to claim 4, wherein the corn base has four or more base openings.

7. The device according to claim 1, wherein the corn base has two or more base openings formed through the concave upper surface and aligned along a length of the corn base, and one or more lateral strips of the concave upper surface of the corn base separate the two or more base openings.

8. The device according to claim 7, wherein the butter base has one or more lateral grooves formed into the upper surface, across the width of the butter base, which segregate the butter base into several separate platforms, wherein the one or more grooves are spaced apart and configured to register with and to accept the one or more lateral strips of the corn base.

9. The device according to claim 2, wherein the containment wall has one or more lateral drainage slot disposed along the lower edge adjacent the floor, to drain a liquid disposed within the trough out through the one or more drainage slot.

10. The device according to claim 9, wherein the floor includes a tapered portion disposed between the peripheral wall and the containment wall that tapers downward away from the lower end of the peripheral wall, toward the one or more drainage slot.

11. The device according to claim 9, wherein the butter stick rest further includes at least one brace that extends from the inside surface of the containment wall to the outside surface of the peripheral wall, to rigidly secure the containment wall to the peripheral wall, and wherein the opposed side wall of the frame of the corn rest has at least one vertical slot that registers with the at least one brace.

12. The device according to claim 11, wherein the one or more lateral drainage slot is disposed within each of the pair of opposed side walls of the containment wall.

13. The device according to claim 2, wherein the containment wall has one or more vertical drainage slot disposed proximate the lower edge adjacent the floor and extending within the containment wall, to drain a liquid disposed within the trough out through the one or more drainage slot.

14. The device according to claim 2, wherein the butter stick rest further includes at least one brace that extends from the inside surface of the containment wall to the outside surface of the peripheral wall, to rigidly secure the containment wall to the peripheral wall, and wherein the opposed side wall of the frame of the corn rest has at least one vertical slot that registers with the at least one brace.

15. The device according to claim 14, wherein the one or more vertical drainage slot is disposed within each of the pair of opposed end walls of the containment wall.

16. The device according to claim 1, wherein in the first position, a portion of the top surface of the butter stick is exposed through the one or more openings in the corn base to an ear of corn placed on the concave upper surface of the corn base.

17. The device according to claim 5, wherein the two or more separate platforms register with and are accepted within the one or more openings in the corn base.

18. The device according to claim 17, wherein the one or more lateral strips of the corn base have a thickness that is substantially the same as the depth of the one or more lateral grooves of the butter base.

19. The device according to claim 5, wherein the one or more lateral strips of the corn base have a thickness that is substantially the same as the depth of the one or more lateral grooves of the butter base.

* * * * *